United States Patent

[11] 3,588,363

[72] Inventors Marvin Bernard Herscher
Camden;
Thomas Brooks Martin, Burlington, N.J.
[21] Appl. No. 846,035
[22] Filed July 30, 1969
[45] Patented June 28, 1971
[73] Assignee RCA Corporation

[54] WORD RECOGNITION SYSTEM FOR VOICE CONTROLLER
10 Claims, 7 Drawing Figs.

[52] U.S. Cl. .......... 179/15A
[51] Int. Cl. .......... G10l 1/00
[50] Field of Search .......... 179/1 (AS), 15.55

*Primary Examiner*—William C. Cooper
*Assistant Examiner*—Jon Bradford Leaheey
*Attorney*—E. J. Norton

ABSTRACT: The invention herein described was made in the course of or under a contract or subcontract thereunder with the department of the Air Force. A speech recognition system wherein selected sounds are recognized by analysis of their spectral characteristics. Sounds are recognized on the basis of the broad slope characteristics, energy ratio characteristics and broad slope ratio characteristics of the amplitude-frequency spectrum of the input sounds. Sound recognition signals based on these characteristics are sequentially combined to recognize particular words.

INVENTORS
Marvin B. Herscher and
Thomas B. Martin
BY Edward J. Norton
ATTORNEY

INVENTORS.
Marvin B. Herscher and
Thomas B. Martin.
BY Edward J. Norton
ATTORNEY INVENTORS
Marvin B. Herscher and
Thomas B. Martin BY Edward J. Norton
ATTORNEY INVENTORS.
Marvin B. Herscher and
Thomas B. Martin
BY
Edward J. Norton
ATTORNEY

WORD RECOGNITION SYSTEM FOR VOICE CONTROLLER

This invention relates to speech recognition systems.

There have been two main approaches to machine recognition of speech in the prior art. The first approach has concentrated on determining formant locations in the spectrum of input sounds. A formant is defined as a peak in the amplitude-frequency spectrum envelope of the corresponding speech sound. The difficulty with this approach is that formant locations and amplitudes will differ from speaker to speaker. For this reason such formant location systems have suffered from poor recognition scores when more than one speaker uses the system or when the localized conditions, such as noise, are unpredictable.

The second main approach to speech recognition has concentrated on the sumulation of the human processes of speech recognition. Speech can be considered as a succession of steady-state frequency spectra and spectral transitions. In speaking, different positions of the tongue, lips, and jaw give rise to varying shapes of the vocal tract. Each shape generates a distinct frequency spectrum and each change of shape gives rise to a spectral transition. In addition vocal cord vibrations give rise to voiced sounds, and noiselike sounds which are produced by the movement of air across the edges of the teeth and by partial closure of the vocal cords. In order to simulate the human process of speech recognition, all of the above acoustical events must be correlated with linguistic and semantic processes. The complexity of the problem of human simulation of speech recognition is therefore enormous and this approach has not had much success.

The system disclosed recognizes selected input speech sounds by analyzing the amplitude-frequency spectrum of the input speech sound.

Means are provided for deriving the amplitude-frequency spectrum of the input speech sound and extracting spectral signal waves representing amplitude levels of the spectrum envelope in selected ranges of frequency.

The extracted spectral waves are processed in a broad slope identification means in order to provide signal waves for identifying broad positive and broad negative slopes in selected regions of the input sound spectrum envelope.

The extracted spectral signal waves are also provided at the input terminals of means for determining energy ratios and for providing corresponding indication signals. Energy ratio indication signals so provided correspond to the ratios of sums of the amplitudes of selected ones of spectral signal waves to sums of the amplitudes of other selected ones of the extracted spectral signal waves.

Means are also provided for the determination of slope ratios and for generating corresponding slope ratio indication signals. The slope ratio indication signals generated correspond to the ratios of sums of the amplitudes of selected ones of broad slope identification signal waves to sums of the amplitudes of other selected ones of the broad slope indication signal waves.

The broad slope identification signal waves, energy ratio indication signal waves and the slope ratio indication signal waves are provided at the input terminals of the means for récognizing the input speech sound. The sound recognition means determines which one of the selected input speech sounds is present and provides a corresponding output signal.

IN THE DRAWINGS

The philosophy of the present invention is based on the classification of speech sounds in a hierarchial organization. The heirarchy comprises three basic types of spectral features: broad class features, common basic features, and unique phoneme features. Broad class features are those features which are relatively insensitive to localized noise and may be the only information which can be provided under poor communications conditions. Examples of broad class features are vowel and vowellike sounds, voiced noiselike consonants, unvoiced noiselike consonants, short gaps, pauses and energy bursts. Common basic features are those sounds which are common to very similar phonemes but which do not serve to differentiate between these phonemes. Examples of common basic features are */f,s/* and */1,m,n/*.

Unique phoneme features are the very localized spectral characteristics which differentiate between the various similar phonemes. Examples of unique phoneme features are the */f/* sound in fin and the */p/* sound in pin which serve to differentiate the two words.

Sound recognition, and subsequently word recognition, is accomplished by identification of class features, common basic features and unique phoneme features. The identification of the latter features is provided by identifying broad slope characteristics, energy ratio characteristics and slope ratio characteristics of the envelope of the amplitude-frequency spectrum of the input speech sound.

Absolute energy amplitude levels and absolute slope characteristics may be used; however, ratios of these quantities are less sensitive to amplitude fluctuations than the corresponding absolute values.

After recognition of particular sounds is accomplished through the heirarchical organization, sequence logic is provided to bring together corresponding sound indication signals in order to identify the presence of particular words in the input speech.

The word identification signals may then be used for display and machine control functions.

Figure 1:
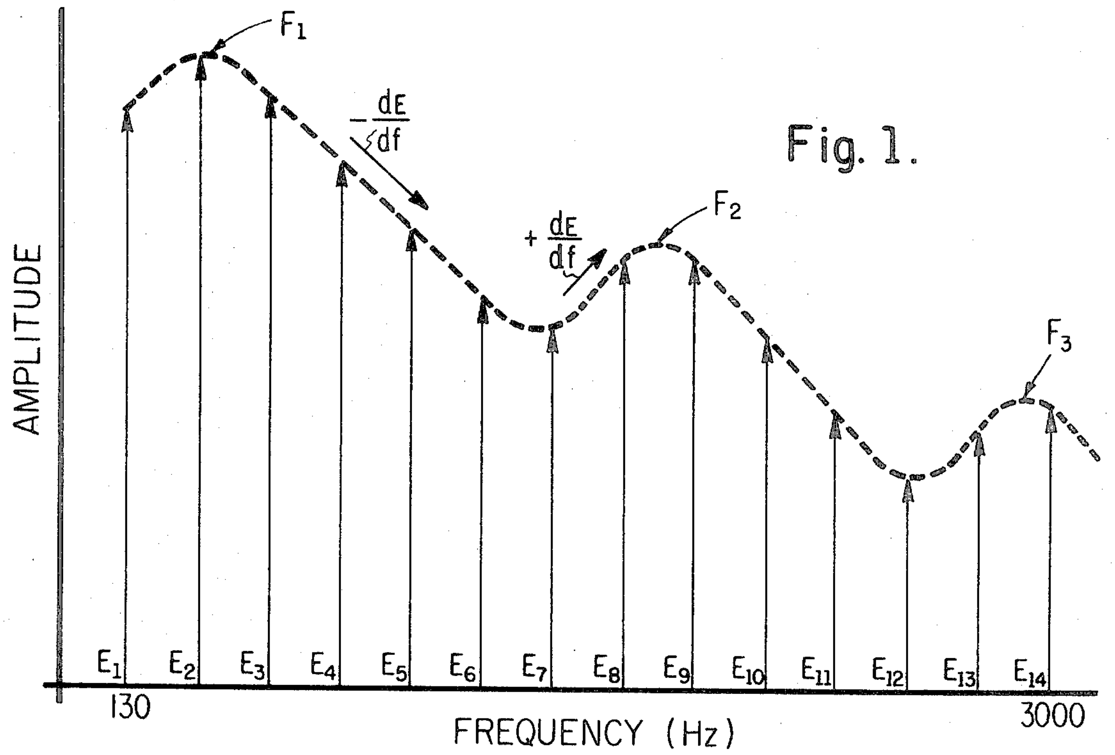
FIG. 1 is a representation of the amplitude-frequency spectrum of a typical input speech sound.

Referring now to the amplitude-frequency spectrum shown in FIG. 1, the vertical arrows $E_1$—$E_{14}$ represent the amplitude levels of spectral signal waves at selected frequencies in the spectrum of typical speech sound. The dashed line in FIG. 1 represents the envelope of the spectrum. The peaks $F_1$, $F_2$, and $F_3$ of the envelope are designated as the formants of the input speech sound.

Different input speech sounds will have different formant locations. Many of the prior art speech recognition systems concentrate on identifying formant locations in order to recognize particular speech sounds. The present invention goes beyond recognition of formant locations and recognizes sounds through the utilization of the spectral characteristics of broad positive slopes $+dE/df$, broad negative slopes $-dE/df$, ratios of broad slopes and ratios of the amplitude levels of the spectral waves comprising the particular sound spectrum.

Broad slope in the amplitude-frequency spectrum refers to the average rate of change of the amplitude with respect to frequency over a range of frequencies. This is distinguished from the exact rate of change of the amplitude at a given frequency. The characteristic of interest is whether the slope is positive, negative or zero over the selected portion of the spectrum.

Figure 2:
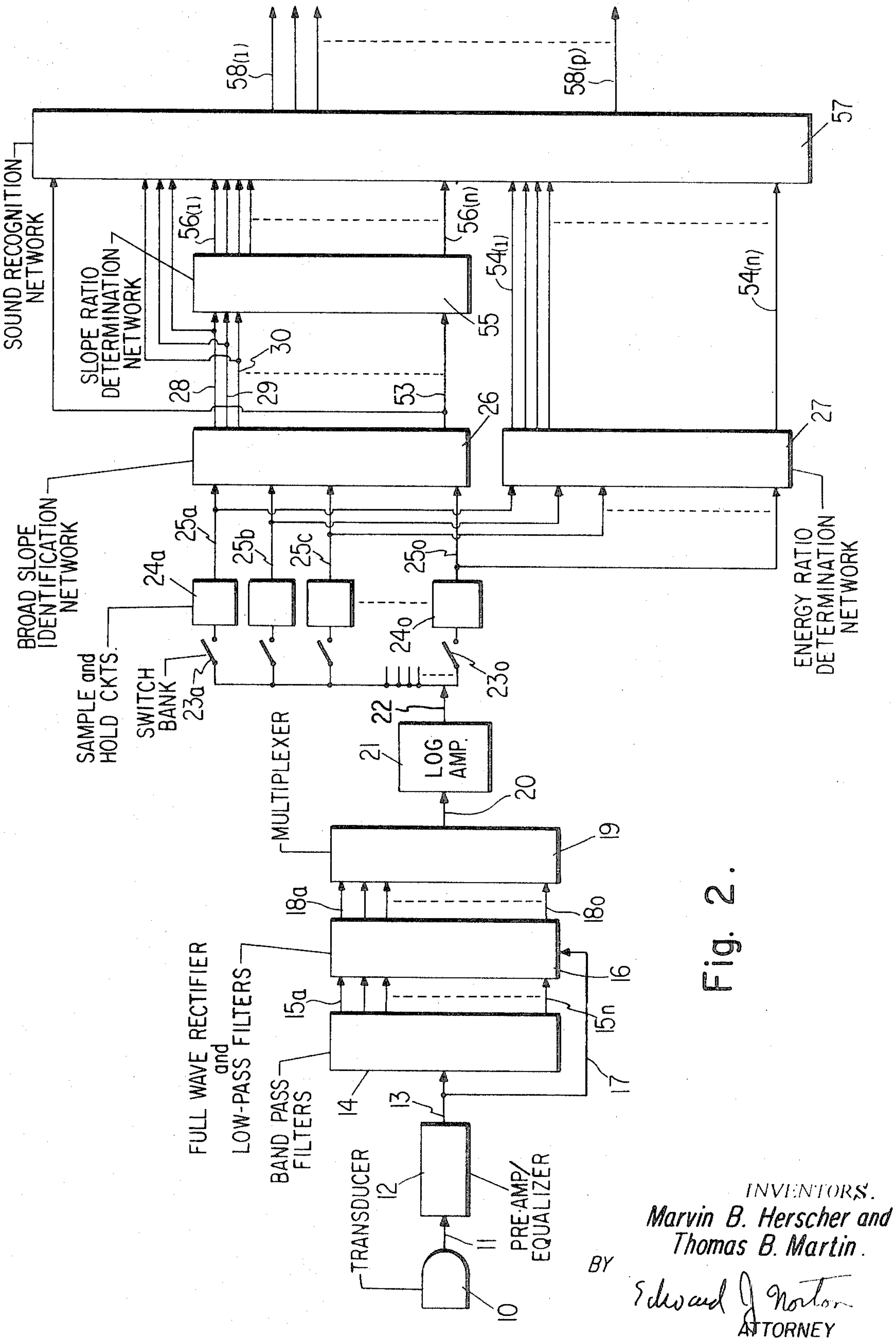
FIG. 2 is a block diagram of a speech recognition system employing the present invention.

The speech recognition system shown in FIG. 2 has a transducer 10 for translating an input sound into a time varying electrical signal. The transducer 10 may be a microphone, when the system is used with live speakers, or it may be a magnetic head, when using taped speech for the input source of sounds.

The time varying electrical signal representing the input speech sound is transferred from the transducer 10 via line 11 to a preamplifier/equalizer 12. Preamplifier/equalizer 12 amplifies the time varying electrical signal on line 11 and also serves to compensate for any irregular frequency characteristics in the transducer 10. The preamplifier/equalizer 12 is also used as an impedance matching device between the transducer 10 and the circuitry coupled to the preamplifier/equalizer 12.

In order to derive a spectrum similar to the one shown in FIG. 1, the amplified and equalized time varying signal is transferred to line 13 from the preamplifier/equalizer 12 and coupled to 14 band-pass filters connected in parallel in the bank of band-pass filters 14. The number of filters in the bank of band-pass filters 14 may, of course, be adjusted to satisfy the requirements of the system.

Each one of the filters in the bank of band-pass filters 14, being coupled to the time varying signal on line 13, provides a time varying output signal on corresponding output lines $15_a$-—$15_n$. Each one of the time varying signals on lines $15_a$—$15_n$ contains that portion of the signal on line 13 which is in the range of frequencies passed by the corresponding band-pass filter in the bank of filters 14.

The time varying signals on lines $15_a$—$15_n$ are individually full wave rectified and low pass filtered in the rectifier/filter bank 16 in order to remove unwanted phase information. In addition to the signals on lines $15_a$—$15_n$, the signal on line 13 is provided at a full wave rectifier-lowpass filter component in the rectifier/filter bank 16 via line 17. The output signals of the rectifier/filter bank 16 are contained in 14 band-pass filtered channels and an additional unfiltered channel representing the total energy in the spectrum. The 15 channels of information containing the 15 time varying signals at the output terminals of the rectifier/filter bank 16 are coupled to a multiplexer 19 via lines $18_a$—$18_o$.

Multiplexer 19 converts the 15 time varying signals on lines $18_a$—18 to one signal which is generated on line 20. The time multiplexed signal on line 20 at the output terminal of multiplexer 19, comprises 15 channel time intervals of equal duration. Each one of the time varying signals on lines $18_a$—$18_o$ occupies one of the 15 channel time intervals provided by the multiplexer 19 on line 20. The multiplexed signal on line 20 is provided at the input terminal of a logarithmic amplifier 21.

The logarithmic amplifier 21 is used to compress the dynamic range of the time varying signals contained in the multiplexed channel time interval on line 20. The logarithm of the multiplexed signal provided by the amplifier 21 also enables ratios of signals contained in the multiplexed signal to be readily computed. Ratios of quantities are desirable because simple amplitude changes, such as those caused by a change in gain, will have no effect on the amplitude of a ratio. Since the amplitude of the signal at the output terminal of the logarithmic amplifier 21 on line 22 is the logarithm of the multiplexed signals on lines $18_a$—$18_o$, then subtracting one signal from another on line 22, or thereafter in the system, is equivalent to generating the ratio of the two signals. The latter operation is mathematically equivalent to:

$$\log A - \log B = \log A/B$$

The output signal of the logarithmic amplifier 21 on line 22 is provided at a bank of 15 switches $23_a$—$23_o$. Each one of the switches $23_a$—$23_o$ is a modulo-fifteen switch and is closed and opened once in a series of 15 consecutive channel time intervals. Switches $23_a$— $23_o$ therefore separate the 15 time varying signals corresponding to the logarithmic signals contained in the 15 channel time intervals. Each one of the switches $23_a$-—$23_o$ is connected to a corresponding one of sample and hold circuits $24_a$—$24_o$.

Each time a signal is passed through one of switches $23_a$-—$23_o$, an amplitude level is sampled by the corresponding one of sample and hold circuits $24_a$—$24_o$. The amplitude level sampled is held for 15 channel time intervals until the associated one of switches $23_a$—$23_o$ is again closed, whereupon a new amplitude level is sampled and held in the corresponding one of sample and hold circuits $24_a$—$24_o$. After sampling the signals in a complete set of 15 channel time intervals, sample and hold circuits $24_a$—$24_o$ provide the sampled amplitude levels, on lines $25_a$—$25_o$. The sampled amplitude levels represent the spectral waves of the sound spectrum after logarithmic compression and are shown as the vertical arrows in FIG. 1.

The spectral waves on lines $25_a$—$25_o$ are simultaneously provided at the input terminals of a broad slope identification network 26 and an energy ratio determination network 27.

The broad slope identification network 26 analyzes the amplitude-frequency spectrum of the input sound in accordance with particular formulas to provide analog signals representing broad positive and broad negative slopes in selected regions of the amplitude-frequency spectrum. The analog signals are transferred out of the broad slope identification network 26 via lines 28—53. Details of the operation of the broad slope identification network 26 will be more fully discussed herein.

In the energy ratio determination network 27 selected ones of the spectral waves on lines $25_a$—$25_o$ are compared in amplitude with respect to each other and appropriate indication signals are provided at a plurality of output lines, $54_1$—$54_n$. The details of the operation of the energy ratio determination network 27 will be more fully discussed herein.

Coupled to the output lines 28—53 of the broad slope identification network 26 is the slope ratio determination network 55. Selected ones of the broad slope identification signals provide on lines 28—53 are analyzed in the slope ratio determination network 55. The slope ratio determination network 55 provides appropriate slope ratio indication signals at a plurality of output lines $56_1$—$56_m$. The operation of the slope ratio determination network 55 will be more fully discussed herein.

The broad slope identification signals on lines 28—53 and the energy ratio indication signals on lines $54_1$—$54_n$ and the slope ratio indication signals on lines $56_1$—$56_m$ are provided at the input terminals of the sound recognition network 57. The sound recognition network 57 contains the necessary logic circuitry, including sequence recognition logic, to identify the particular input speech sound. The identification process is a result of the advanced knowledge of the spectral characteristics of particular input speech sound. The sound recognition network 57 is tailored to the particular predetermined vocabulary which the sound recognition system has been designed to recognize. Output signals, corresponding to words recognized by the system, are provided on lines $58_1$—$58_p$. Examples of particular recognition circuits will be discussed herein.

Figure 3:
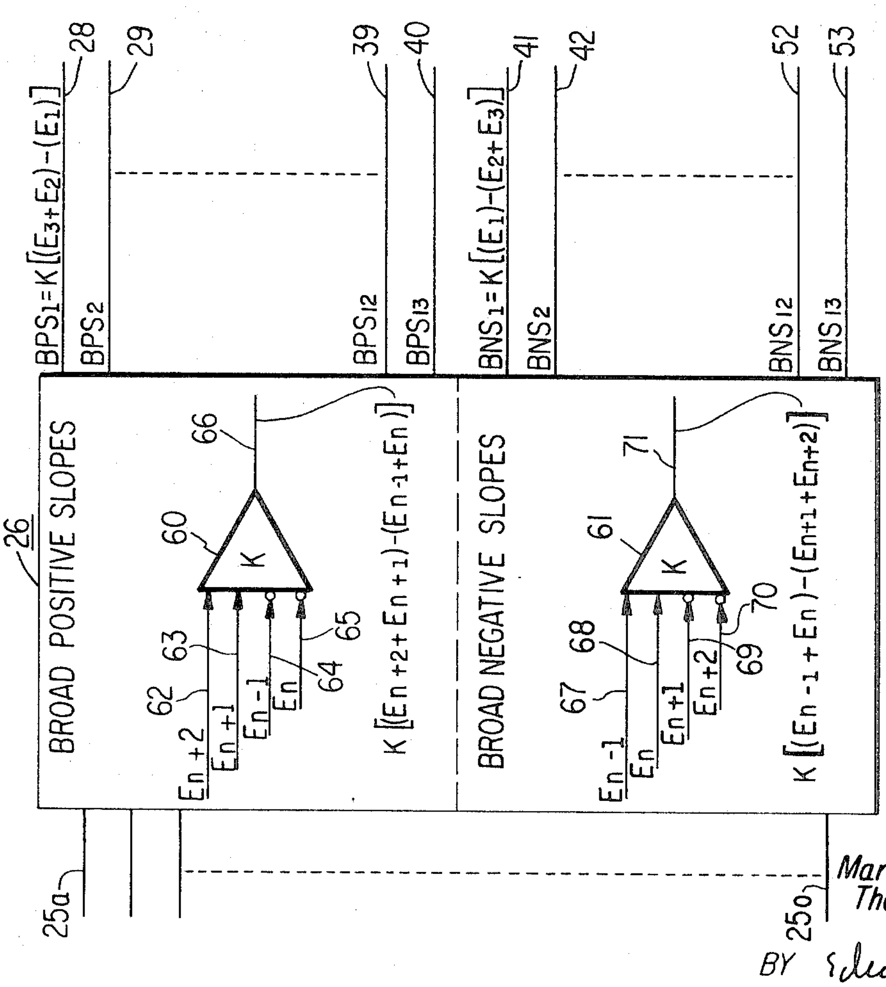
FIG. 3 is a block diagram of the broad slope identification network used in the speech recognition system shown in FIG. 2.

Referring now to FIG. 3, the manner in which broad positive and broad negative slopes are determined is shown. In order to determine broad positive slopes (BPS) the following equation is implemented;

$$BPS_n = K\,[\,(E_{n+2} + {}^{E}n+1) - (E_{n11} + {}^{E}n)\,].$$

Where; E refers to the amplitude level of the spectral wave, subscript $n$ refers to the particular one of the spectral waves and K is a constant.

In order to identify broad negative slopes (BNS) the following equation is implemented;

$$BNS_n = K\,[\,(E_{n11} + {}^{E}n) - (E_{n+1}\,{}^{E}n+2)\,].$$

The physical implementation of the equations for the broad positive and broad negative slopes given above is accomplished through the use of operational amplifiers typified by units 60 and 61 shown in FIG. 3. These units when fitted with appropriate peripheral circuit components will provide analog output signals which are proportional to the difference between the sum of the amplitudes of the signals at "excitatory" input terminals and the sum of the amplitudes of the signals at "inhibitory" input terminals.

In effect, signals provide at excitatory input terminals are processed as positive amplitude signals and signals provided at inhibitory input terminals are processed as negative amplitude signals.

For example in unit 60, shown in FIG. 3, lines 62 and 63 are connected to the excitatory terminals of unit 60 (arrow notation). Lines 64 and 65 are connected to the inhibitory terminals of unit 60 (arrow and circle notation). When the spectral signal waves $E_{n+2}$ and $E_{n+1}$ are respectively provided on lines 62 and 63 and spectral signal waves $E_{n11}$ and $E_n$ are respectively provided on lines 64 and 65, the equation for the broad positive slope $BPS_n$ will be computed and the output signal corresponding to $BPS_n$ will be provided at the output terminal of unit 60 on line 66. The constant K is the gain provided by unit 60. The transfer function of unit 60, and all other units, is such that analog signals are generated at the corresponding output terminals only when the computation results in a positive value.

With 14 spectral signal waves, $E_1$—$E_{14}$, there will be 13 computations for the broad positive slope. This occurs because the 13th computation contains but one spectral signal wave $E_{14}$ at the excitatory input terminal of the appropriate operational amplifier. There are 13 units similar to unit 60 necessary to perform all 13 broad positive slope computations.

In a like manner operational amplifier unit 61 is representative of the manner in which the broad negative slope identification signals are generated. In unit 61 spectral signal waves $E_{n11}$ and $E_n$ are provided at the excitatory terminals of unit 61 via lines 67 and 68 respectively and spectral signal waves $E_{n+1}$ and $E_{n+2}$ are provided at the inhibitory terminals of unit 61 via lines 69 and 70 respectively. The output signal from unit 61 is simply the analog signal representing $BNS_n$ and is provided on line 71. Again, there will be 13 computations made for broad negative slopes since in the implementation of $BNS_{13}$ there is but one spectral signal wave $E_{14}$ at an inhibitory terminal of the appropriate unit.

The implementation of the broad positive and negative slope equations for the system having 14 spectral signal waves available requires 13 operational amplifiers similar to unit 60 and 13 operational amplifiers similar to unit 61. The output signals for each one of the operational amplifiers is the analog value of the difference between the sum of the amplitudes at the excitatory terminals and the sum of the amplitudes at the inhibitory terminals. These output signals are provided on lines 28—53.

Figure 4:
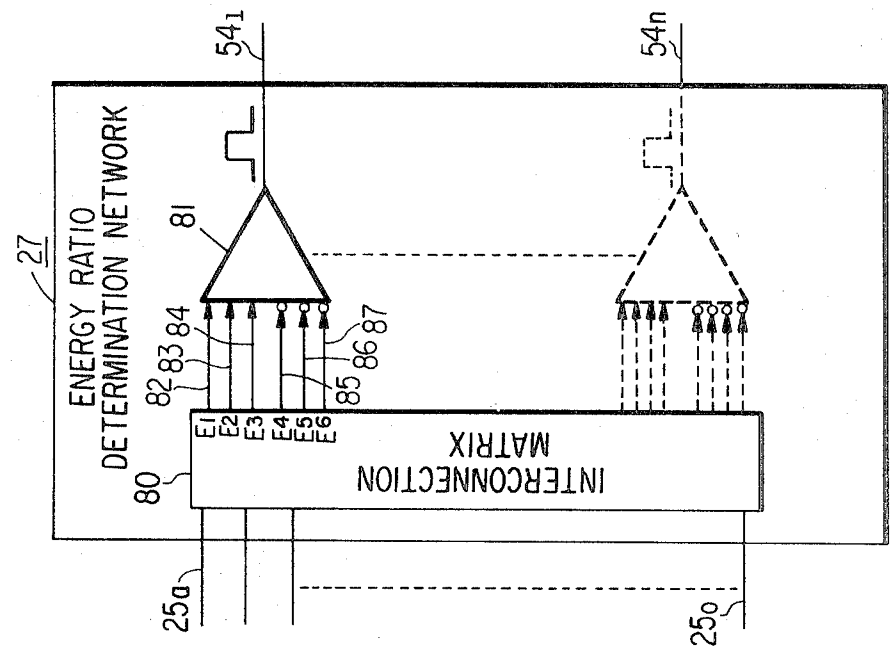
FIG. 4 is a block diagram of the energy ratio determination network used in the speech recognition system shown in FIG. 2.

Referring now to FIG. 4, the manner in which energy ratio determination is accomplished is shown in greater detail. The spectral signal waves are provided at the input terminals of the energy ratio determination network 27 on lines $25_a$—$25_o$.

The spectral signal waves pass through an interconnection matrix 80 in order to provide multiple access to the spectral waves on lines $25_a$—$25_o$. A plurality of operational amplifiers, having excitatory and inhibitory input terminals, are coupled to the interconnection matrix 80. The transfer functions of the operational amplifiers, located in the energy ratio determination network 27, are such that a quantized signal, or binary 1, is provided at the output terminal of the corresponding operational amplifier when the sum the amplitude levels of the signals provided at the excitatory terminals exceeds the sum of the amplitude levels provided at the inhibitory terminals by a predetermined threshold level.

The number of units contained in the energy ratio determination network 27 and the particular spectral signal waves provided at the input terminals thereof are determined by the particular vocabulary which the system is designed to recognize.

In FIG. 4, one operational amplifier 81, typical of the plurality of units located in the energy ratio determination network 27, is shown. Spectral signal waves $E_1$, $E_2$ and $E_3$ are provided at the excitatory input terminals on lines 82, 83 and 84 respectively. Spectral signal waves $E_4$, $E_5$ and $E_6$ are provided at the inhibitory terminals of unit 81 on lines 85, 86 and 87 respectively. When the sum of the amplitude levels of spectral waves $E_1$, $E_2$ and $E_3$ exceeds the sum of the amplitude levels of spectral waves $E_4$, $E_5$ and $E_6$ by a predetermined threshold level set for unit 81, a binary 1 is generated and provided on the output line 54.

The binary signal on line 54 indicates that the amplitude level in the region of the input spectrum in the range of the frequencies corresponding to spectral signal waves $E_1$—$E_3$ is generally greater than the amplitude of the spectrum in the region of frequencies encompassing spectral signal waves $E_4$—$E_6$. In a like manner other regions of the input spectrum are compared with respect to amplitude levels in the energy ratio determination network. The output signals generated by the operational amplifiers contained in the energy ratio determination network 27 are provided at the lines $54_1$—$54_n$.

Figure 5:
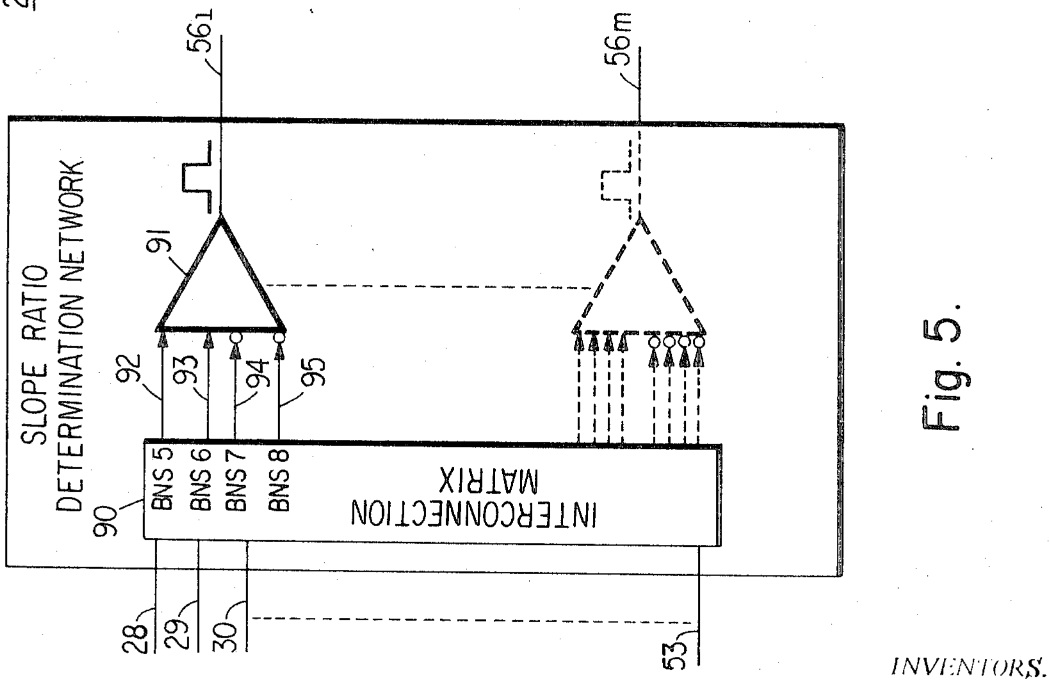
FIG. 5 is a block diagram of the slope ratio determination network used in the speech recognition system shown in FIG. 2.

The slope ratio determination network 55, shown in FIG. 5, operates in the same manner as the energy ratio determination network 27. The analog signals representing broad positive and broad negative slopes generated in the broad slope identification network 26 are provided at the input terminals of the slope ratio determination network 55 via lines 28—53. The slope identification signals are passed through an interconnection matrix 90 which provides the slope indication signals, on lines 28—53, at a multiplicity of terminals. A plurality of operational amplifiers are coupled to the interconnection matrix 90 in order to generate slope ratio indication signals.

The operational amplifiers in the slope ratio determination network 55 generate high level quantized signals when the sum of the amplitudes of slope indication signals provided at the excitatory terminals of an operational amplifier exceeds the sum of the amplitudes of slope indication signals provided at the inhibitory terminals of that operational amplifier by a predetermined threshold level. For example, in FIG. 5, operational amplifier 91 will provide a binary 1 signal on line 56 when the sum of the amplitudes of slope indication signals BNS 5 and BNS 6, on lines 92 and 93 respectively, exceeds the sum of the amplitudes of slope indication signals BNS 7 and BNS 8, on lines 94 and 95 respectively. Again, the number of operational amplifiers required and their coupling to the interconnection matrix 90 will be determined by the vocabulary which the system is designed to recognize. The binary signals generated at the output terminals of the operational amplifiers in the slope ratio determination network 55 are provided on lines $56_1$—$56_m$.

Figure 6:
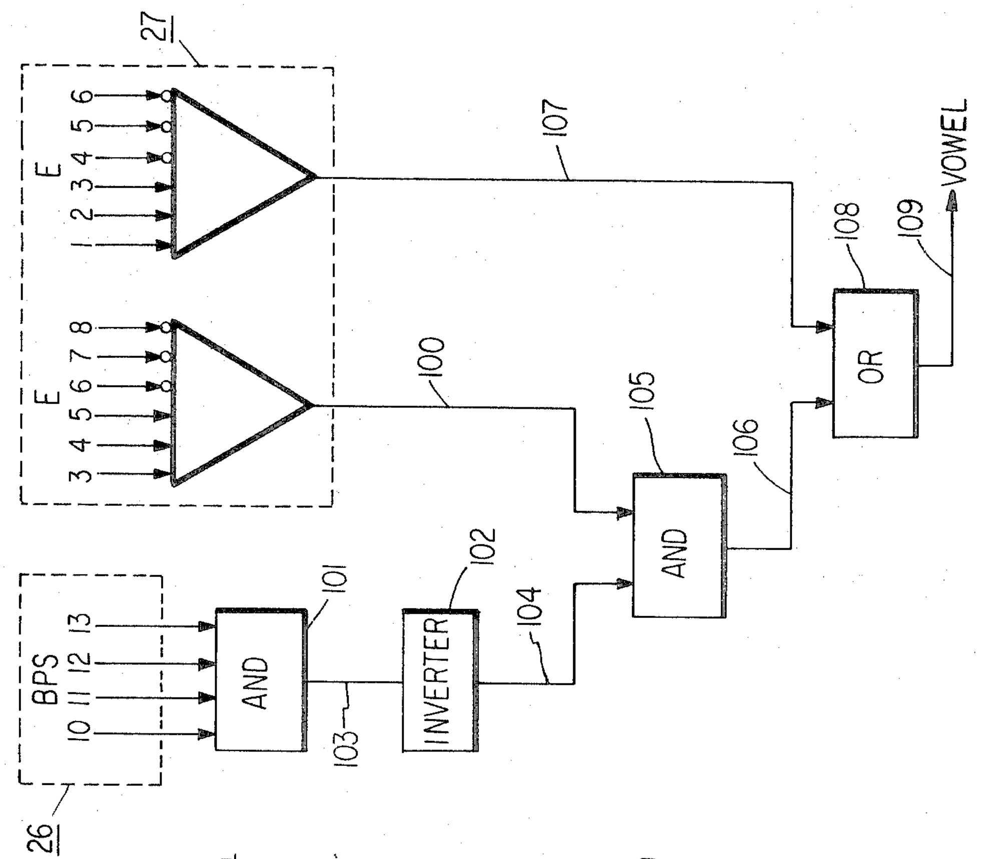
FIG. 6 is a schematic diagram of the vowel class feature recognition network used in the speech recognition system shown in FIG. 2

FIG. 6 shows the manner in which some of the spectral characteristics, previously derived, are used. Specifically, FIG. 6 displays the vowel class feature recognition circuit located in the sound recognition network 57.

The vowel class feature recognition circuit utilizes output signals from the broad slope identification network 26 and output signals from the energy ratio determination network 27. Specifically, a high level quantized energy ratio indication signal is provided on line 100, from an output terminal of the energy ratio determination network 27, when the sum of the amplitude levels of spectral waves $E_3$, $E_4$ and $E_5$ exceeds the sum of the amplitudes of spectral waves $E_6$, $E_7$ and $E_8$ by a predetermined threshold level.

Furthermore, broad positive slope identification signals BPS 10—BPS 13 are provided from the broad slope identification network 26 to AND gate 101. An inverter 102 is coupled to the AND gate 101. When broad positive slope identification signals BPS 10, 11, 12 and 13 are lower in amplitude level than the required gate voltage of AND gate 101, the output signal from AND gate 101, generated on line 103, will be at a low level. Inverter 102 will invert the low level signal on line 103 thereby generating a high level signal on line 104 coupled to the output terminal of inverter 102.

The high level signals on lines 104 and 100 are provided at the input terminals of AND gate 105. When the high level signals on lines 104 and 100 occur simultaneously a high level signal will be generated at the output terminal of AND gate 105 and provided on line 106 coupled thereto.

In addition, another energy ratio determination signal is provided from the energy ratio determination network 27 which is provided on line 107. The high level signal on line 107 is generated when the sum of the amplitude levels of spectral waves $E_1$, $E_2$, and $E_3$ exceeds the sum of the amplitude levels of spectral signal waves $E_4$, $E_5$ and $E_6$ by a predetermined threshold level. The signals on lines 107 and 106 are provided at the input terminals of OR gate 108. When the signal level on line 106 or 107 is at a high level, a high level signal will be generated at the output of OR gate 108 on line 109. The existence of a high level signal on line 109 indicates that the input sound being analyzed is a vowel sound.

When the signal level on line 109 goes high, the sound being analyzed has exhibited certain ones of the invariant class features of a vowel sound.

Figure 7:
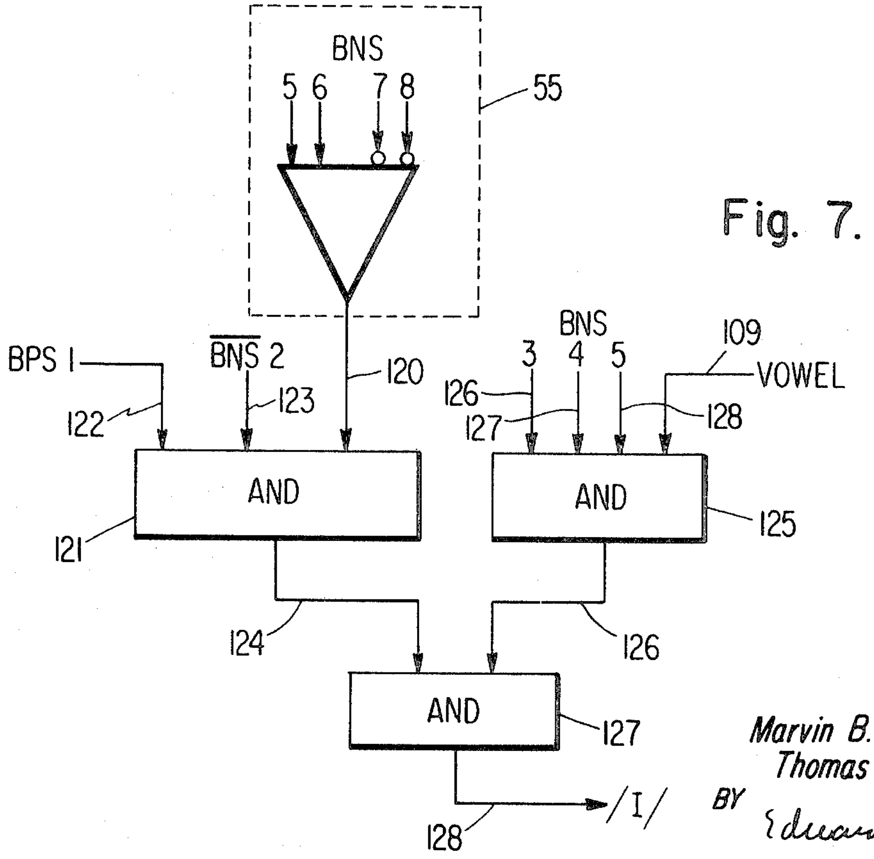
FIG. 7 is a schematic diagram of a basic feature recognition network used in the speech recognition system shown in FIG. 2.

FIG. 7 is an example of the type of recognition circuit used to identify a common basic feature of the input sound. Specifically, FIG. 7 shows the recognition network of the sound /I/, as in the work fit.

In FIG. 7, a quantized high level signal is provided on line 120, coupled from one of the output terminals of the slope ratio determination network 55, when the sum of the amplitudes of slope identification signals BNS 5 and 6 exceeds the sum of the amplitudes of slope identification signals BNS 7 and 8 by a predetermined threshold level. When this condition exists, the high level signal on line 120 is provided at AND gate 121. There are three input terminals to AND gate 121. In addition to the signal coupled to AND gate 121 on line 120, slope identification signal BPS 1 on line 122 and a slope identification signal indicating the lack of BNS 2 on line 123 are provided at the input terminals of AND gate 121. When the signal levels on lines 122, 123 and 120 are all high, a high level signal will be generated at the output terminal of AND gate 121 and provided on line 124.

In addition, slope identification signals BNS 3, 4 and 5 are respectively provided at the input terminals of AND gate 125 on lines 126, 127 and 128. A fourth input signal to AND gate 125 is provided on line 109. Line 109 provides a high level signal when the sound being analyzed is a vowel sound. When lines 126, 127, 128 and 109 each provide high level signals to AND gate 125, a high level signal is generated at the output thereof and provided on line 126.

Line 124, coupled to the output terminal of AND gate 121, and line 126, coupled to the output terminal of AND gate 125, are each coupled to the input terminals of AND gate 127. When lines 124 and 126 provide high level signals to AND gate 127, a high level signal is generated at the output terminal of AND gate 127 and provided on line 128. When a high level signal is generated on line 128, the input vowel sound is recognized as the /I/ sound.

In any system utilizing the invention there will be class feature, common basic feature and unique phoneme feature recognition networks. The structure of these networks will depend upon the particular vocabulary which the system is designed to recognize.

The system disclosed is adaptable to the voice patterns of particular individuals. This adaptation is accomplished by emphasizing certain characteristics in the spectrum of sounds generated in the particular individual's vocal tract. For example in FIG. 7, for a certain individual it might be necessary to use slope indication signals BNS 4, 5 and 6 respectively on lines 126—128 in order to get a highly reliable recognition of the /I/ sound.

Likewise, emphasis on other characteristics of a particular individuals vocal tract may be accomplished in other feature recognition networks in the system.

When sound recognition is accomplished, the signals corresponding to the sounds recognize are sequentially combined to provide word recognition. When words are recognized, corresponding signals waves are generated and are provided at the output terminals of the sound recognition network 57 on lines $\mathbf{58_1}$—$\mathbf{58_p}$, shown in FIG. 2.

We claim:

1. A system for analyzing and recognizing any one of a plurality of input speech sounds, wherein recognition of said plurality of input speech sounds is based on the spectral characteristics of said sounds, said system comprising:

spectrum analyzing means for generating at least *n* spectral signal waves, said spectral waves representing the amplitude-frequency spectrum of the input speech sound, each of said spectral signal waves corresponding to the signal waves in a selected range of frequencies in said spectrum;

broad slope identification means coupled to said spectrum analyzing means for generating a plurality of broad slope identification signal waves, said spectral waves being processed in said slope identification means for identifying positive and negative slopes in selected regions of the envelope of said input speech sound spectrum;

energy ratio determination means coupled to said spectrum analyzing means for generating energy ratio indication signals, said energy ratio indication signals corresponding to the ratios of sums of the amplitudes of selected ones of said spectral signal waves to sums of the amplitudes of other selected ones of said spectral signal waves;

slope ratio determination means coupled to said broad slope identification means for generating slope ratio indication signals, said slope ratio indication signals corresponding to the ratios of sums of the amplitudes of selected ones of said broad slope identification signal waves to sums of the amplitudes of other selected ones of said broad slope identification signal waves; and sound recognition means coupled to said broad slope identification means, to said energy ratio determination means and to said slope ratio determination means for recognizing said input speech sound and for providing a corresponding sound recognition signal.

2. A system for analyzing and recognizing any one of a plurality of input speech sounds, wherein recognition of said plurality of input speech sounds is based on the spectral characteristics of said sounds, said system comprising:

spectrum analyzing means for generating at least *n* spectral signal waves, said spectral waves representing the amplitude-frequency spectrum of the input speech sound, each of said spectral signal waves corresponding to the signal waves in a selected range of frequencies in said spectrum;

broad slope identification means coupled to said spectrum analyzing means for generating a plurality of broad slope identification signal waves, said spectral waves being processed in said slope identification means for identifying positive and negative slopes in selected regions of the envelope of said input speech sound spectrum;

energy ratio determination means coupled to said spectrum analyzing means for generating energy ratio indication signals, said energy ratio indication signals being provided at corresponding output terminals thereof when the sum of the amplitudes of a corresponding first plurality of selected spectral signal waves exceeds the sum of the amplitudes of a corresponding second plurality of selected spectral signal waves by a predetermined threshold level;

slope ratio determination means coupled to said broad slope identification means for generating slope ratio indication signals, said slope ratio indication signals being provided at corresponding output terminals thereof when the sum of amplitudes of a corresponding first plurality of selected broad slope identification signal waves exceeds the sum of the amplitudes of a corresponding second plurality of selected broad slope identification signal waves by a corresponding predetermined threshold level; and sound recognition means coupled to said broad slope identification means to said energy ratio determination means and to said slope ratio determination means for recognizing said input speech sound and for providing a corresponding sound recognition signal.

3. The system according to claim 2, wherein said spectrum analyzing means includes means for providing a total energy signal wave, said total energy signal wave representing the energy content of the spectral signal waves in the full range of selected frequencies contained in said amplitude-frequency spectrum.

4. The system according to claim 2, wherein said sound recognition means includes sound sequence recognition means for combining selected sound recognition signals for determining the presence of particular words in said input speech sounds.

5. A system for analyzing and recognizing any one of a plurality of input speech sounds, wherein recognition of said plurality of input speech sounds is based on the spectral characteristics of said sounds said system comprising:

spectrum analyzing means for generating at least M spectral signal waves, said spectral waves representing the amplitude-frequency spectrum of the input speech sound, each of said spectral signal waves corresponding to the signal wave in a selected range of frequencies in said spectrum;

multiplexer means coupled to said spectrum analyzing means for providing a time multiplexed signal wave of at least M channel time intervals at an output terminal thereof, each of said spectral signal waves occupying a corresponding channel time interval;

a nonlinear amplifier having an input terminal coupled to the output terminal of said multiplexer means for generating a signal representing the logarithm of said time multiplexed signal wave;

at least *n* sample and hold circuits including switching means coupled to said nonlinear amplifier, said sample and hold circuits being sequentially operated by said switching means at times corresponding to the times of occurrence of said channel time intervals, for providing at least *n* logarithmic amplitude levels at output terminals thereof;

broad slope identification means coupled to said sample and hold circuits for generating a plurality of broad slope identification signal waves at output terminals thereof, said slope identification means including a first and second set of input terminals and corresponding output terminals, said broad slope identification signals being coupled to corresponding output terminals and representing the sum of the logarithmic amplitude levels coupled to a first set of input terminals minus the sum of the logarithmic amplitude levels coupled to the corresponding second set of input terminals;

energy ratio determination means, having a first and second set of input terminals and corresponding output terminals, coupled to said sample and hold circuits for providing energy ratio indication signals, an energy ratio indication signal being provided at a corresponding output terminal when the sum of the logarithmic amplitude levels coupled to a corresponding first set of input terminals minus the sum of the logarithmic amplitude levels coupled to the corresponding second set of input terminals exceeds a predetermined threshold level;

slope ratio determination means, having a first and second set of input terminals and corresponding output terminals, coupled to said broad slope identification means for providing slope ratio indication signals, said slope ratio indication signals being provided at said corresponding output terminals when the sum of the amplitudes of the slope identification signals coupled to a corresponding first set of input terminals exceeds the sum of the amplitudes of the slope indication signals coupled to the corresponding second set of input terminals by a predetermined threshold level; and sound recognition means coupled to said broad slope identification means, to said energy ratio determination means and to said slope ratio determination means for recognizing said input speech sound and for providing a corresponding recognition signal.

6. The system according to claim 5, wherein said spectrum analyzing means includes means for providing a total energy signal wave, said total energy signal wave representing the energy content of the spectral signal waves in the full range of selected frequencies contained in said amplitude-frequency spectrum and wherein said total energy signal wave is multiplexed in said time multiplexed signal wave and occupies a corresponding channel time interval therein.

7. The system according to claim 5, wherein said broad slope identification means comprises:

broad positive slope identification means for providing broad positive slope identification signals, said broad positive slope identification signals being proportional to the amplitude of spectral signal waves $(n+2)+(n+1)$ minus $(n-1)+(n)$; and broad negative slope identification means for providing broad negative slope identification signals, said broad negative slope identification signals being proportional to the amplitude of spectral signal waves $(n-1)+(n)$ minus (*n*+1a'z(*n*+2).

8. The system according to claim 6, wherein said sound recognition means includes sound sequence recognition means for combining selected sound recognition signals for determining the presence of particular words in said input speech sounds and wherein the existence of word beginners, endings and pauses therein are determined by processing said total energy signal wave.

9. A system for analyzing and recognizing any one of a plurality of input speech sounds, wherein recognition of said plurality of input speech sounds is based on the spectral characteristics of said sounds, said system comprising:

sound transducing means for translating said input speech sounds into corresponding electrical signal waves;

a preamplifier having an input and an output terminal, said input terminal being coupled to said sound transducing means for amplifying said corresponding electrical signal wave and for providing impedance matching between said sound transducing means and circuit elements coupled to said preamplifier output terminal;

a plurality of band-pass filters connected in parallel and serially coupled to the output terminal of said preamplifier for separating said electrical signal wave into a corresponding plurality of spectral signal waves;

a plurality of full wave rectifier-lowpass filter combinations, each one of said plurality of combinations being coupled to one of said plurality of band-pass filters, for providing corresponding full wave rectified spectral signal waves devoid of unwanted phase information;

multiplexer means coupled to said plurality of full wave rectifier-lowpass filter combinations providing a time multiplexed signal wave of at least M channel time intervals at an output terminal thereof, M being a number equal to the number of band-pass filters, each of said spectral signal waves occupying a corresponding channel time interval;

a nonlinear amplifier, having an input terminal coupled to the output terminal of said multiplexer means, for generating a signal representing the logarithm of said time multiplexed signal wave;

at least M sample and hold circuits including switching means coupled to said nonlinear amplifier, said sample and hold circuits being sequentially operated by said switching means at times corresponding to the times of occurrence of said channel time intervals, for providing at least M logarithmic amplitude levels at output terminals thereof;

broad slope identification means coupled to said sample and hold circuits for generating a plurality of broad slope identification signal waves at output terminals thereof, said slope identification means including first and second sets of input terminals and corresponding output terminals, said broad slope identification signals being coupled to corresponding output terminals representing the sum of the logarithmic amplitude levels coupled to a corresponding first set of input terminals minus the sum of the logarithmic amplitude levels coupled to the corresponding second set of input terminals;

energy ratio determination means, having first and second sets of input terminals and corresponding output terminals, coupled to said sample and hold circuits for providing energy ratio indication signals, an energy ratio indication signal being provided at corresponding output terminals when the sum of the logarithmic amplitude levels coupled to the corresponding first set of input terminals minus the sum of the logarithmic amplitude levels coupled to the corresponding second set of input terminals exceeds a predetermined threshold level;

slope ratio determination means, having first and second sets of input terminals and corresponding output terminals, coupled to said broad slope identification means for providing slope ratio indication signals, said slope ratio indication signals coupled to a corresponding first set of input terminals exceeds the sum of the amplitude levels of the slope indication signals coupled to the corresponding second set of input terminals by a predetermined threshold level; and sound recognition means coupled to said broad slope identification means, to said energy ratio determination means and to said slope ratio determination means for recognizing said input speech sound and for providing a corresponding recognition signal.

10. The system according to claim 9 wherein said broad slope identification means comprises:

broad positive slope identification means for providing broad positive slope identification signals, said broad positive slope identification signals being proportional to the amplitude level of spectral signal waves $(n+2)+(n+1)$ minus $(n-1)$A'z$(n)$; and broad negative slope identification means for providing broad negative slope identification signals, said broad negative slope identification signals being proportional to the amplitude level of spectral signal waves $(n-1)+(n)$ minus $(n+1)+(n+2)$.

UNITED STATES PATENT OFFICE

CERTIFICATE OF CORRECTION

Patent No. 3,588,363 Dated June 28, 1971

Inventor(s) Marvin Bernard Herscher & Thomas Brooks Martin

It is certified that error appears in the above-identified patent and that said Letters Patent are hereby corrected as shown below:

Column 10, line 20, "(n+1a'z(n+2)" should be ---(n+1) + (n+2)---

Column 11, line 18, after "signals" and before "coupled" insert ---being provided at said output terminals when the sum of the amplitude levels of the slope identification signals---.

Column 12, line 14, "(n-1) A'z(n)" should be ---(n-1) + (n)---.

Signed and sealed this 18th day of July 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334